Patented Feb. 5, 1946

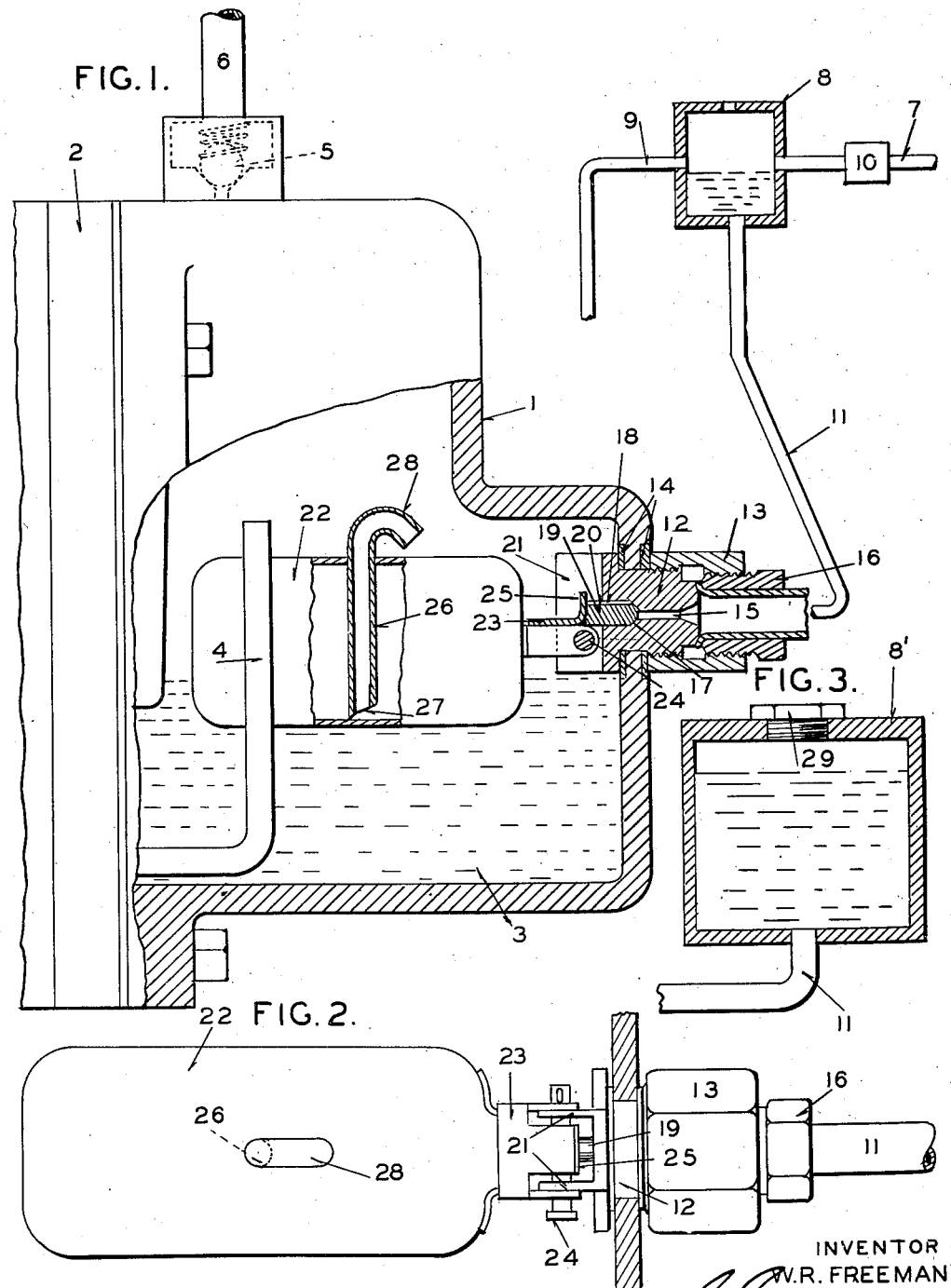

2,394,437

UNITED STATES PATENT OFFICE 2,394,437

LUBRICATION SYSTEM

Walter R. Freeman, Clayton, Mo., assignor to Wagner Electric Corporation, St. Louis, Mo., a corporation of Delaware Application October 1, 1943, Serial No. 504,537

4 Claims. (Cl. 230—206)

My invention relates to lubrication systems and more particularly to means for maintaining a constant supply of lubricant in a reservoir.

One of the objects of my invention is to provide improved means for maintaining a substantially constant oil level in an oil reservoir which has the oil therein subjected to a fluid, such as air, and being under varying pressures.

Another object of my invention is to provide an improved float-controlled valve means for admitting oil or other fluid to a reservoir from a supply source.

Yet another object of my invention is to produce an improved hollow float member that can be employed to float on a liquid in a chamber which also contains a fluid, such as air, under varying pressures and contaminated with particles of the liquid.

Other objects of my invention will become apparent from the following description taken in connection with the accompanying drawing in which Figure 1 is a view of a portion of a lubrication system for an air compressor having my invention embodied therein, said view being partly in section; Figure 2 is a top view of the float and control valve; and Figure 3 is a view showing the supply source as a hand-filled auxiliary reservoir.

Referring to the drawing in detail and particularly to Figures 1 and 2, I have shown my invention embodied in a lubricating system for an air compressor but it is to be understood that it may be employed in other places wherever it is desired to maintain the liquid level line at a predetermined height in a receptacle which has therein a fluid, such as air, the pressure of which varies. The numeral 1 indicates an oil reservoir or oil dome for a rotary compressor 2. This reservoir is totally enclosed and contains a body of oil 3. The air compressed by the compressor is discharged through the pipe 4 into the top portion of the reservoir above the body of oil. From here the air may pass out of the reservoir through the outlet check valve 5 and to the conduit 6 which leads to a storage tank. When the compressor is operating, the discharged compressed air will be under pressure, thereby placing the body of oil 3 under pressure for forcing it through suitable conduits (not shown) into the compressor and thus lubricating the working parts thereof. Since there is oil around the working parts, some oil will be picked up by the air during compressing and consequently the discharged compressed air which enters the top portion of the reservoir carries oil in the form of small particles. When the compressor is unloaded, that is, prevented from compressing air, as for example, by closing the inlet to the compressor by a suitable valve structure (not shown), the compressed air in the reservoir above the body of oil is exhausted to atmosphere to thus take the pressure off the body of oil so that oil will not be forced into the compressor during its unloaded condition.

Under certain conditions it is desirable to provide a source of oil supply for the body of oil in the reservoir and means to insure the maintenance of the oil level substantially constant, thereby eliminating the necessity of periodic checking. When the compressor is associated with and driven by an internal combustion engine of a motor vehicle, the reservoir of the compressor can be supplied with the same oil as employed in the crankcase of the internal combustion engine. With this supply, the oil level in the oil reservoir can be maintained constant if oil is allowed to enter the oil reservoir of the compressor when the oil level drops and then only when the air in the oil reservoir is at atmospheric pressure. If oil were permitted to enter the reservoir when the compressor is operating and compressing air, the compressed air in the reservoir would blow out through the conduit for the incoming oil and thus result in loss of compressed air and oil.

When it is desired to supply oil to the oil reservoir for the compressor from the crankcase of the engine, a branch conduit 7 can be connected to the engine pressure oiling system to thus feed oil into an auxiliary reservoir 8 which has an overflow outlet pipe 9 leading back to the crankcase of the engine. A relief valve 10 is inserted in conduit 7 to thus allow only such quantity of oil into the auxiliary reservoir 8 as to maintain the level up to the overflow pipe. Thus a constant oil supply which can be connected to the oil reservoir of the compressor by a pipe 11 is provided by the auxiliary reservoir for supplying any quantity of oil for maintaining the desired predetermined level of the body of oil 3 in the compressor reservoir. The auxiliary reservoir 8 is preferably placed at a higher point than the oil reservoir for the compressor, thus producing a head so that oil can flow by gravity through the pipe 11 into the oil reservoir.

Since oil should be supplied to the compressor reservoir when the oil level drops and then only when air in the oil reservoir is at atmospheric pressure, such is accomplished, in accordance with my invention, by a special float and a special valve controlled by the float. The wall of the compressor reservoir is provided with a fitting 12 which is clamped to the wall by a special nut 13 having gaskets 14 to prevent leakage around the fitting. The fitting is provided with a small passage 15 which communicates with pipe 11, said pipe being connected to the fitting and nut 13 by a second nut 16. The inner end of passage 15 is provided with a valve seat 17 which is at the inner end of a bore 18. Slidably mounted in this bore is a valve element 19 in the form of a cylindrical rod having a cone-shaped end for cooperation with the valve seat 17. The valve element is also provided with a small longitudinal groove 20 in its surface to permit flow of fluid past the valve element.

The inner end of fitting 12 is provided with spaced projections 21 to which is pivotally mounted a float 22, said mounting being accomplished by a member 23 secured to the body of the float and a pivot pin 24 extending through member 23 and the two projections 21. Member 23 is also provided with a projection 25 for cooperation with the end of the valve element 19. Thus when the oil is at the desired predetermined level, the float will assume such a position that projection 25 will apply pressure to the end of the valve element and maintain it seated with sufficient force that the oil, which is under a slight pressure due to the head, cannot enter the reservoir.

The float 22 is of hollow construction, being made of thin metal or some other suitable material so that the air therein will give it the proper buoyancy. Since the air in the reservoir above the body of oil will have varying pressures as from atmospheric pressure to such high pressures as one hundred pounds per square inch, it is not possible to have the interior of the float sealed as otherwise it would collapse due to the differential in pressure between the exterior and the interior thereof. In order to maintain the pressure on the interior of the float the same as the exterior, it is necessary to permit interchange of air between the exterior and the interior. If only a hole were employed to permit this interchange, the interior of the float would ultimately become filled with such a quantity of oil that it would no longer function in the proper manner. This is readily seen since oil would not only be splashed into the hole but also accumulate due to the compressed air carrying oil in the form of small particles and mist. Oil will be carried into the float by incoming air when the pressure of the air rises. This oil would collect on the walls of the interior of the float and then accumulate in the bottom of the float where it would remain.

In order to prevent the float from filling with oil, I provide the float with a tube 26 open at both ends and providing communication between the exterior and the interior of the float. The lower end 27 of the pipe is closely adjacent the bottom of the interior of the float and the upper end of the portion of the pipe extending from the float is provided with a gooseneck 28. By means of this pipe there can be free interchange of air between the interior and the exterior of the float. As oil accumulates in the interior of the float, it can never rise above the opening in the inner end of the pipe. This is apparent since, if it should rise above the opening, then when the air in the reservoir is allowed to assume atmospheric pressure, the air under superatmospheric pressure present in the interior of the float would force the oil out through the pipe.

From the above detailed description of the structure, the operation thereof is believed to be apparent. When the body of oil in the reservoir is at the desired predetermined level, the float will assume the position shown in Figure 1 and under these conditions will apply a pressure to the end of valve element 19 and thus maintain it seated, thereby preventing oil from flowing into the reservoir from conduit 11 and the supply source 8. If the body of oil in the compressor reservoir should decrease, thus causing a lower level line, the float will move downwardly with the surface of the oil, thereby moving projection 25 away from the end of the valve element. If the air in the reservoir is at atmospheric pressure, then the pressure of the oil acting on the valve element will be sufficient to move the valve element off its seat, thereby permitting oil to flow into the reservoir and bring the level line of the oil to the predetermined height. As the oil rises, the float will also move up and again cause reseating of the valve element and the shutting off of the flow of oil to the reservoir.

If the air in the compressor reservoir is under a pressure greater than atmospheric pressure, then this pressure will so act on the valve element as to hold it seated against the low pressure of the oil, notwithstanding the fact that the oil level may be such that the position of the float will prevent it from applying a seating pressure to the valve element. Thus the oil level may fall below the predetermined height but no oil will be permitted to enter the reservoir from the supply source when there is compressed air in the reservoir. Air under pressure cannot blow oil out through pipe 11 and also cause leakage of the compressed air. However, if the oil level is below the predetermined height when the air in the reservoir is connected with atmosphere in order to assume atmospheric pressure, the valve element will be opened and the desired oil level restored.

In place of using the lubricating system of an internal combustion engine as the source of auxiliary oil supply for the compressor reservoir, a separate auxiliary supply reservoir can be employed. This arrangement is shown in Figure 2 wherein the auxiliary oil reservoir 8' is connected to pipe 11 in place of the previous collecting reservoir 8 shown in Figure 1. The auxiliary reservoir 8' is filled by hand by removing the plug 29. The employment of the auxiliary reservoir 8' is very useful where the compressor is mounted in such a position where it is difficult to connect it to the engine oiling system and free access cannot be had to readily fill the compressor reservoir. Under such conditions the operator may be negligent and fail to keep the reservoir properly filled. The auxiliary reservoir 8' can be placed in any convenient position for filling and preferably should be at a higher level than the reservoir of the compressor in order to produce a head on the oil which acts against the inner end of the valve element 19. By keeping oil in the auxiliary reservoir 8', the operator will know that the level line of the body of oil in the compressor reservoir will be maintained at the proper height by the operation of the float-controlled valve means.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a lubricant containing reservoir having a body of liquid lubricant therein subjected to fluid under varying degrees of pressure, a supply source of lubricant, conduit means for conducting lubricant from the source to the reservoir, said source being so arranged that the lubricant will be under a pressure at the point where the conduit enters the reservoir, and means associated with the conduit and the body of lubricant for maintaining said body at a substantially constant level, said means comprising a valve element, an axially movable valve receiving member arranged in a wall of the reservoir and a float so operatively associated with the valve element as to permit opening of the valve element when the lubricant falls below the constant level, said valve element being so arranged that the pressure of the lubricant in the conduit will act to unseat it and the fluid in the chamber when above the pressure of the lubricant in the conduit will act to hold it seated, said valve closed by pressure on the lubricant when the float is unable to close said valve.

2. In apparatus of the class described, a lubricant containing reservoir having a body of liquid lubricant therein subjected to fluid under varying degrees of pressure, a supply source of lubricant, conduit means for conducting lubricant from the source to the reservoir, said source being so arranged that the lubricant will be under a pressure at the point where the conduit enters the reservoir, and means associated with the conduit and the body of lubricant for maintaining said body at a substantially constant level, said means comprising a valve element, an axially movable valve receiving member arranged in a wall of the reservoir and so associated with the conduit as to be moved to valve open position by the pressure of the lubricant in the conduit when the pressure of the fluid in the reservoir is lower than the pressure of said lubricant, a float and means for so mounting the float and operatively connecting it to the valve element that when the body of lubricant has a predetermined surface level the valve element will be held in valve closed position without the action of the fluid pressure but will be ineffective in controlling the moving of the valve element to valve open position when the surface level is lower.

3. In apparatus of the class described, an oil containing reservoir for an air compressor having a body of oil therein and being subject to compressed air discharged by the compressor when operating and to air at atmospheric pressure when the compressor is unloaded, a supply body of oil positioned above the reservoir, a plug insertable in a wall of the reservoir having a bore therein, a conduit connecting the supply body with the reservoir through said bore, valve means in said plug for the conduit comprising a valve seat formed in said bore and a reciprocable valve element in said bore acted upon when seated by the oil under pressure in the conduit and applying a force in a direction to unseat the valve element and acted upon by air under pressure in the reservoir and applying a force in a direction to seat the valve element, a float associated with the body of oil, means for pivotally connecting the float to the reservoir wall, and means operable by the float when the oil level in the reservoir is above a predetermined height for applying a seating pressure to the valve element, said last named means permitting the float to move without moving the valve element when the oil level drops below the predetermined height.

4. In apparatus of the class described, an oil containing reservoir for an air compressor having a body of oil therein for lubricating said compressor and being subject to compressed air discharged by the compressor when operating and to air at atmospheric pressure when the compressor is unloaded, said compressed air carrying small particles of oil, a supply body of oil positioned above the reservoir, a plug having a bore therein arranged in a wall of the reservoir, a conduit connecting the supply body with the reservoir through said bore, valve means in said plug for the conduit comprising a valve seat formed in said bore and a valve element reciprocable in said bore acted upon by the oil under pressure in the conduit and applying a force in a direction to unseat the valve element and acted upon by air under pressure in the reservoir and applying a force in a direction to seat the valve element, a hollow float associated with the body of oil, a conduit for placing the interior of the float in communication with the exterior and having its open inner end positioned closely adjacent the bottom of the interior of the float and its outer end positioned above the surface of the oil body, and means operable by the float when the oil level in the reservoir is above a predetermined height for applying a seating pressure to the valve element, said last named means permitting the float to move without controlling the valve element when the oil level drops below the predetermined height.

WALTER R. FREEMAN.